June 9, 1959
H. I. BAKER
2,890,429
ELECTRICAL TEMPERATURE SENSING DEVICE
Filed Oct. 11, 1955
2 Sheets-Sheet 1
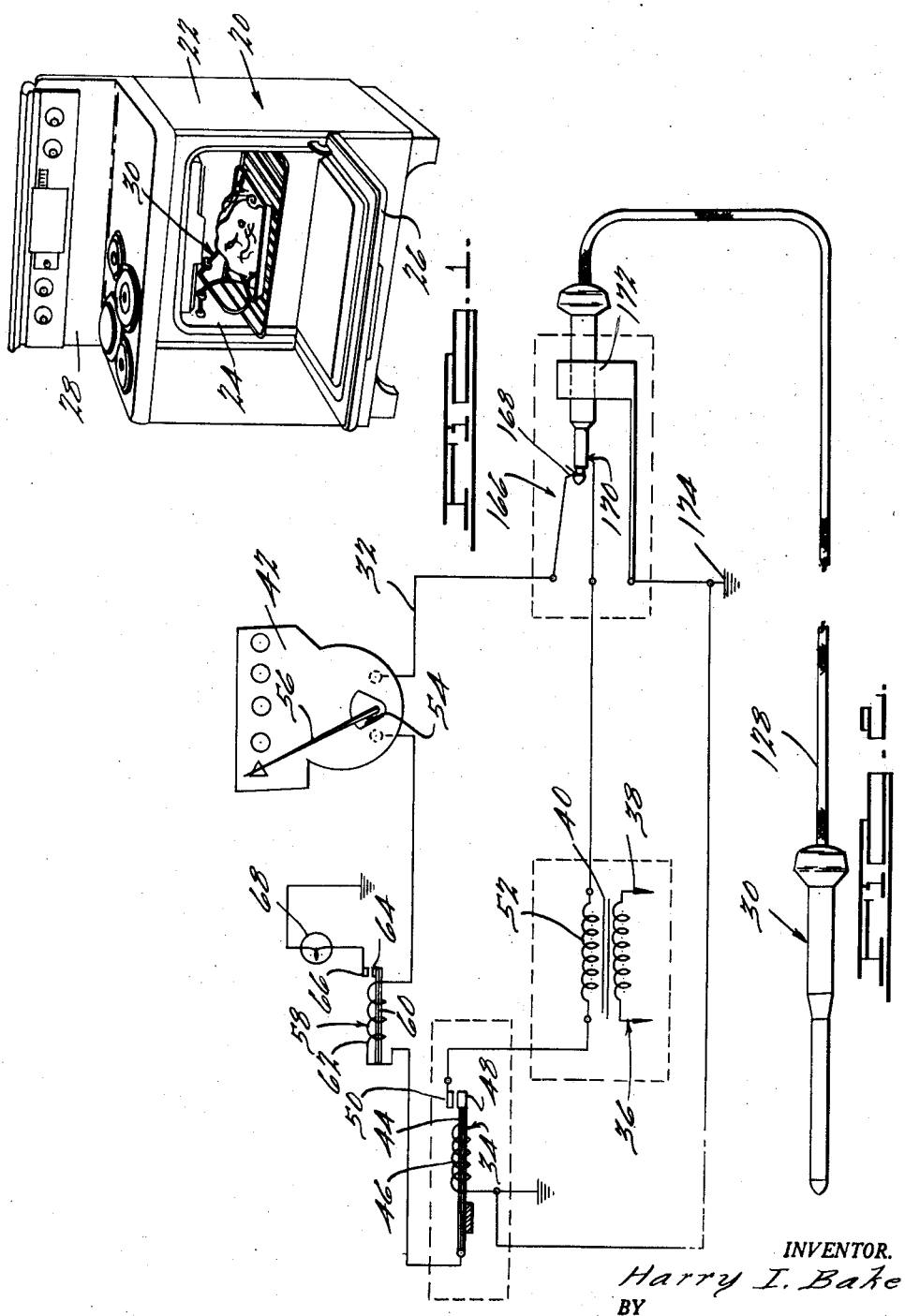
INVENTOR.
Harry I. Baker
BY
Harness, Dickey & Pierce
ATTORNEYS June 9, 1959
H. I. BAKER
2,890,429
ELECTRICAL TEMPERATURE SENSING DEVICE
Filed Oct. 11, 1955
2 Sheets-Sheet 2
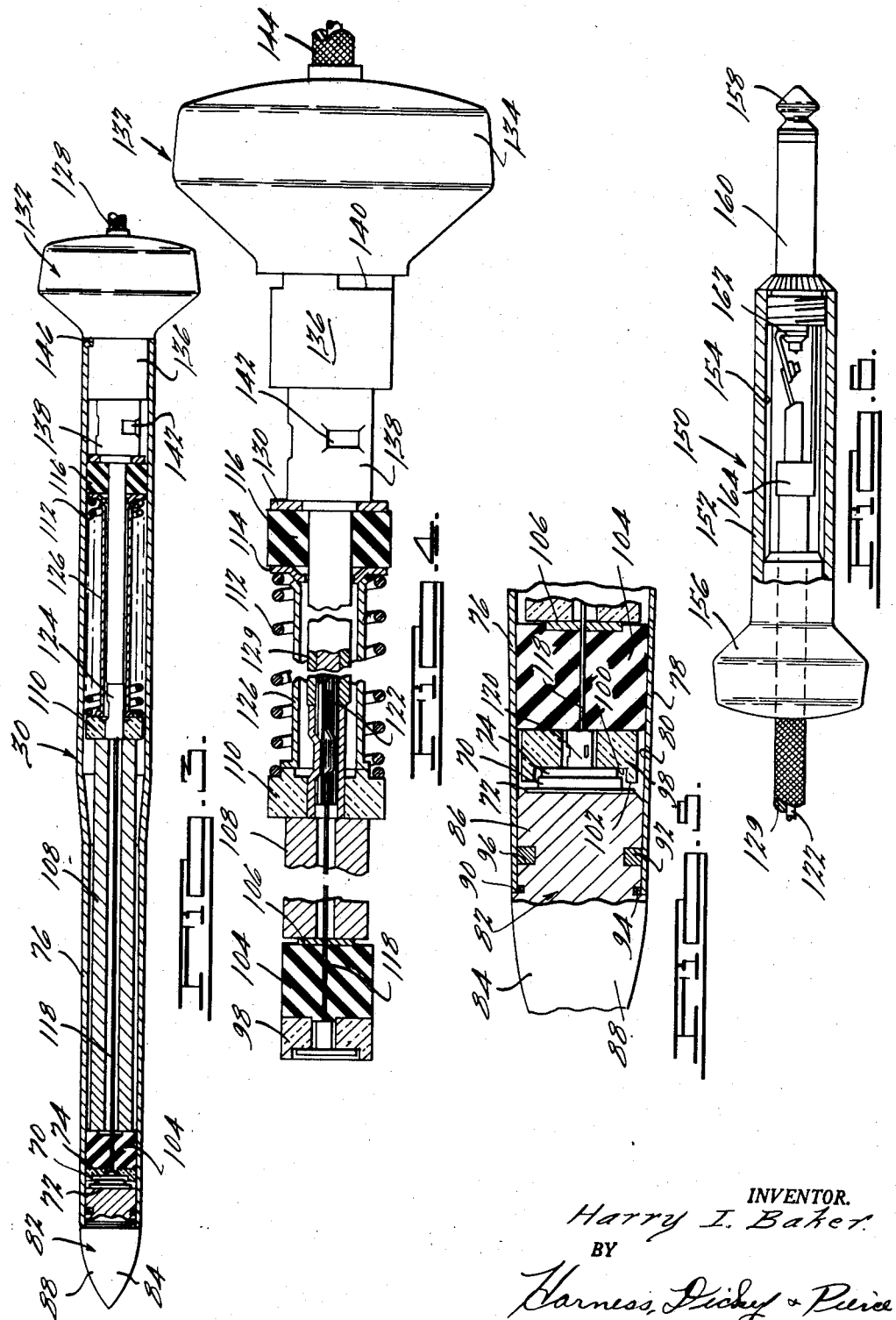
INVENTOR.
*Harry I. Baker.*
BY
*Harness, Dickey & Pierce.*
ATTORNEYS.

United States Patent Office 2,890,429
Patented June 9, 1959

2,890,429

ELECTRICAL TEMPERATURE SENSING DEVICE

Harry I. Baker, Ypsilanti, Mich., assignor to King-Seeley Corporation, Ann Arbor, Mich., a corporation of Michigan Application October 11, 1955, Serial No. 539,845

8 Claims. (Cl. 338—28)

This invention relates to temperature sensing devices and, more particularly, to an improved culinary temperature sensing device for indicating the temperature of roasts, fowl and the like. Certain features of the temperature sensing device disclosed in this application are not claimed in this application but are claimed in the copending application of Leonard Boddy, Serial No. 524,549, filed July 26, 1955, and the copending application of Ernest L. Klavitter, Serial No. 532,521, filed September 6, 1955, said copending applications being assigned to the assignee of the present invention.

An object of the present invention is to provide an improved temperature sensing device for sensing the temperature of roasts, fowl and the like during the cooking thereof.

Another object of the invention is to reduce the cost of manufacturing and assembling temperature sensing devices of the indicated character.

Another object of the invention is to provide an improved temperature sensing device which may be inserted in roasts, fowl and the like without accumulating excessive amounts of fat, grease and the like thereon and which may be easily and quickly cleaned after being inserted in such viands.

Another object of the invention is to provide an improved temperature sensing device incorporating improved means for effecting a fluid tight seal.

The above as well as other objects and advantages of the present invention will become apparent from the following description, the appended claims and the accompanying drawings wherein:

Figure 1 is a perspective view of a temperature measuring device embodying the present invention, showing the same in installed relationship with respect to a stove;

Fig. 2 is a schematic circuit diagram of the temperature measuring system illustrated in Fig. 1;

Fig. 3 is an enlarged, longitudinal, sectional view of the probe assembly illustrated in Fig. 2;

Fig. 4 is an enlarged longitudinal sectional view of a portion of the probe illustrated in Fig. 3;

Fig. 5 is an enlarged sectional view of another portion of the probe illustrated in Fig. 3; and Fig. 6 is an enlarged elevational view, with portions in section, of the jack illustrated in Fig. 2.

Referring to the drawings, and more particularly to Fig. 1, the present invention is shown in installed relationship with respect to an electric stove, generally designated 20, although it will be understood that the present invention is applicable to other uses. The stove 20 includes a body portion 22 which defines an oven chamber 24, and an oven door 26 is provided which is hingedly connected to the body portion 22 for swinging movement to and from closing relationship with respect to the oven 24. The stove 20 is also shown as being provided with an upwardly extending panel 28 upon which are mounted the burner and oven controls.

In accordance with the present invention, a temperature sensing device, generally designated 30, is provided which is adapted to measure the interior temperature of roasts, fowl and the like as they are being cooked in the oven 24, and which will be described hereinafter in greater detail. The temperature sensing device 30 is adapted to be incorporated in a gauging circuit 32 which receives electric energy, at a voltage regulated by a voltage regulator 34, from a source 36. The source 36 may be of various types, and when the present invention is used in connection with domestic stoves, the source 36 may, for example, comprise a conventional A.C. power line 38 and a step-down transformer 40, the step-down transformer 40 being interposed between the line 38 and the gauging circuit 32 and serving to reduce the voltage of the line 38 within limits which are acceptable for underwriting and safety purposes.

In practice, the voltage received from the line 38 varies between limits which are not close enough for satisfactory operation of a desirably simple electric gauge. For example, the voltage of the line 38 may vary as much as ten volts.

The voltage regulator 34 receives the noticeably variable output of the source 36 and delivers pulsating energy to the gauging circuit 32, the effective voltage of the regulator 34 being substantially independent of variations in the voltage of the source. Under these conditions, it will be appreciated that a relatively simple rheostatic element may be utilized in the gauging circuit, the rheostatic element serving to vary the resistance in the gauging circuit in response to variations in temperature in the roast, and thereby controlling the current through and, consequently, the position of a gauge 42 which is interposed in the gauging circuit 32.

The regulator 34 may, for example, be of the type disclosed in the copending application of Leonard Boddy, Serial No. 108,773, filed August 5, 1949, now Patent No. 2,835,885, for Electrical Control Apparatus and assigned to the assignee of the present invention. In general the regulator 34 may be characterized as including a thermally responsive member 44, at least a portion of which tends to move as a consequence of changes in the temperature thereof. Current modulating means are associated with this member so as to respond to the tendency to move. The current modulating means serves to increase the heating current supplied to the regulator in response to decreases in temperature thereof and vice versa. Consequently, throughout at least a predetermined range of voltages of the source, the current modulating means periodically increases or decreases the current supplied to the thermally responsive member and causes it to be maintained at a substantially uniform average temperature. On this basis, it will be appreciated that the thermally responsive member receives energy in pulsating form, at a substantially uniform rate. This energy rate may, of course, be expressed as $E^2/r$, E being the effective or root-mean square voltage of the energy pulsations and $r$ being the electrical resistance of the regulator. Under any given ambient temperature condition, the electrical resistance of the regulator may, for all practical purposes, be regarded as constant. Consequently, for any given ambient temperature condition, the effective voltage of the energy pulsations absorbed by the regulator is also substantially constant and independent of variations in the voltage of the associated source of energy. The control of the effects of the ambient temperature changes may be effected in accordance with the invention disclosed in the aforementioned copending application.

The regulator 34 may further be characterized in that it may be adapted to have an associated gauge or load circuit connected thereto in parallel with the current consuming elements of the regulator, and subject to the current modulating means. Consequently, the load circuit also receives energy pulsations having an effective voltage which is substantially independent of variations in the voltage source. In addition, the load current has no appreciable heating effect on the thermally responsive element. Consequently, the effective voltage established by the regulator is independent of the relative magnitude of the heating and load currents. Furthermore, if desired, a plurality of load circuits may be connected in parallel with one regulator and the load currents may be individually varied at random without affecting in any way the action of the regulator.

As diagrammatically shown in Fig. 2, the regulator 34 may comprise a thermally responsive trimetallic element 44 which carries a heater winding 46. One terminal of the winding 46 is grounded as indicated and the other terminal thereof is electrically connected to the element 44. The current modulating means comprises a pair of contacts 48 and 50, the element 44 carrying the movable contact 48 which normally engages the fixed contact 50. The contact 50 is connected to one terminal of the secondary winding 52 of the step-down transformer 40, the other terminal of the secondary winding being connected to the gauging circuit, as will be described hereinafter in greater detail.

With this relationship, it will be appreciated that when the gauging circuit is closed, a circuit is also completed from the secondary winding 52 of the transformer through the contacts 50 and 48, the body of the element 44 and the heater winding 46 to ground. Completion of this circuit supplies heat to the element 44 and causes its temperature to rise. As is disclosed in the aforementioned copending application, the electrical resistance of the element 44 is so low that for all practical purposes, all of the heating effect can be considered as being derived from the winding 46. Consequently, the element 44 can also serve as a conductor for both the gauging and the heating currents.

Upon being heated, the element 44 warps and separates the contacts 48 and 50, interrupting the circuit through the winding 46. If desired, a shunt resistor may be connected in parallel with the contacts 48 and 50 so as to merely reduce the heating effect of the winding rather than interrupt the current therethrough. When the circuit is interrupted through the winding 46, the element 44 then cools and restores the contacts 48 and 50 to the closed position. Accordingly, as soon as the gauging circuit is closed, the contacts 48 and 50 are periodically opened and closed and the heating current is correspondingly modulated. Consequently, the element 44 acquires a temperature just high enough to hold the contacts 48 and 50 in a condition of incipient closing and opening. This critical temperature can be variously determined, as an incident to manufacture, by adjusting the position of the fixed contact 50 relative to the movable contact 48, so as to correspondingly determine the initial pressure between the contacts. Consequently, neglecting ambient effects, the regulator acts to receive from the source 36 an amount of electric energy, in pulsating form, which has a substantially uniform heating value. On this basis, and since over any period of time the wattage input to the regulator heater ($E^2/r$) is at a constant rate, it is evident that the regulator breaks up the energy supplied by the source 36 into a succession of pulses having an effective voltage which is independent of the variations in the voltage of the source 36.

The voltage impressed across the winding 46 is, of course, equal to the voltage impressed upon the gauging circuit. The gauging circuit 32, therefore, is supplied from the source with pulsating energy at an effective voltage which is substantially independent of variations in the voltage of the source. The regulator 34 thus effectively serves as a regulator of the voltage impressed across the gauging circuit, and current drawn by the gauging circuit is thus independent of variations in voltage of the source.

It will be understood that, if desired, the regulator can be so arranged that the current impulses vary gradually between finite upper and lower values instead of abruptly between a finite upper and lower value. For example, the current modulating means could be replaced by a carbon pile of the type disclosed in the aforementioned copending application, one end of the carbon pile receiving a variable pressure exerted by the end of the element 44. The resistance of such a carbon pile, of course, varies inversely with the pressure exerted thereon. In this case, changes in temperature of the element 44 would tend to cause it to warp but may not cause an actual warpage, whereas in the regulator illustrated, the tendency to warpage produces a finite movement of the element. Alternatively, the regulator may be replaced by a regulator of the hot wire type such as is disclosed in the aforementioned copending application.

Any of a variety of well-known electroresponsive constructions can be employed in connection with the gauge 42, the diagrammatically shown movable elements of which may function to commutate circuits, provide visual indications or otherwise. Preferably, the gauge 42 is of the well-known temperature compensated thermostatic type. Such a gauge employs a bimetallic element 54 which carries a heater winding, warping of the bimetallic element actuating an indicating needle 56 in any well-known manner.

It will be appreciated that the use of a thermostatic gauge is advantageous in that it inherently has some heat capacity which can be matched with the performance of the regulator 34 so that the individual pulsations introduced by the regulator into the current supply are integrated by the gauge. In typical cases, the pulsating rate may, for example, be between sixty and ninety pulsations per minute.

In the circuit illustrated, the gauge 42 is electrically connected in series with a resistor having an inverse temperature coefficient of resistance, the resistor being disposed in the temperature measuring device 30. The temperature sensing device is shaped in the form of a probe and is adapted to be inserted in a roast, fowl or the like so that the tip portion of the probe is disposed in the center or other desired region thereof, the temperature of which it is desired to measure. Thus, changes in the temperature of the resistor effect a corresponding change in the position of the indicating needle 56 of the gauge 42.

An integrating control relay 58 may also be provided having a bimetallic element 60 which carries a heater winding 62. The heater winding 62 is connected in series with the gauge 42 so that the bimetallic element 60 is heated by the heater winding 62 and deflected proportionately to the current flowing through the gauge 42. The bimetallic element 60 carries a contact 64 which is adapted to engage a contact 66. If desired, the contact 66 may be mounted on an adjustable screw so that the position of the contact 66 may be varied relative to the contact 64. In the circuit illustrated, the contact 66 is shown as connected to ground through a signal element 68, although it will be understood that other electroresponsive devices may be controlled by the relay 58. The heater winding 62 is also connected to the bimetallic element 60 with the result that when the contact 64 makes with the contact 66, a circuit is completed through the signal element so as to energize the same. Thus, when the gauge reaches a predetermined position, the bimetallic element 60 is deflected proportionately so that the contact 64 makes with the contact 66 to signal that the roast has reached a predetermined temperature, the initial position of the contact 66 relative to the contact 64 determining the temperature at which the signal element is energized. It will be understood that the control relay 58 may be advantageously employed to perform other functions, as, for example, the control relay may control the heater elements for the oven so that the oven is turned off when the roast is done.

Referring now to Figs. 3, 4 and 5, the temperature sensing device 30 houses the previously referred to variable resistor which is designated 70. The resistor 70 is interposed between a pair of soft silver discs 72 and 74. The resistor 70 is shown as being of flat, circular, disclike form and the silver discs 72 and 74 insure intimate contact with the resistor and also insure good thermal conductivity of the assembly. The silver discs are preferably malleable and fill any rough areas or grooves which may be formed in the surfaces of the resistor during the manufacturing thereof. The resistor 70 and the discs 72 and 74 are disposed in one end portion of a tubular shell 76, having a relatively thin wall 78 which defines a bore 80. The shell 76 is preferably formed of stainless steel which is electrically conductive but which is a relatively poor conductor of heat. A tip 82 is provided which includes a pointed substantially conoidal body portion 84 and an integral substantially cylindrical throat portion 86. The tip member 82 is preferably formed of solid copper, although it will be understood that other materials having relatively high thermal conductivity characteristics may be utilized. The body portion 84 projects outwardly from the casing 76 and the surface 88 of the body portion 84 is adapted to be disposed in and contact the central section of the roast, fowl or the like, the temperature of which it is desired to measure. The throat portion 86 is pressed into the bore 80 of the shell 76 and the silver disc 72 is pressed into intimate contact with the inner end of the throat portion 86 of the tip 82 so as to insure good thermal conductivity between the resistor 70 and the tip 82. When the circuit 32 is closed, the resistor 70 is energized, and the temperature of the resistor rises because of the current flowing therethrough. Since the resistor 70 is in intimate contact with the silver disc 72, which, in turn, is in intimate contact with the adjacent end of the throat portion 86 of the tip 82, the heat generated by the resistor flows through the throat portion 86 and the body portion 84 of the tip 82, the surface 88 of the body portion 84 being in contact with the meat. In order to insure that the heat is transferred from the tip to the roast and to provide a temperature measurement which is a measure of the mean temperature of the entire section of the roast with which the tip is in contact, the tip 82 is constructed so that the area of the heat transfer surface 88 of the body portion 84 is at least twice the transverse cross-sectional area of the throat portion 86. It will be appreciated that when the probe is inserted in the roast, fowl or the like, the body portion 84 may be in contact with meat, bone, fat, muscle or other portions thereof, the heat transfer characteristics of which vary widely. Since the area of the surface 88 is relatively large and is at least twice the transverse cross-sectional area of the throat portion 86, the temperature measurement obtained by the probe is the mean temperature of the entire section in which the tip 82 is disposed. Thus, the copper tip 82 increases the area of the heat transfer surfaces of the thermistor so that heat is transferred from the thermistor to the meat, and the meat, in effect, quenches the thermistor with the result that the thermistor is maintained at a temperature which is substantially the mean temperature of the section of the roast in which the tip is disposed. On the other hand, the stainless steel shell 76 is a relatively poor conductor of heat and the wall 78 of the shell is relatively thin in section so that a poor heat path is provided from the oven to the tip and the temperature of the oven does not directly govern the temperature of the thermistor.

In order to provide a fluid tight seal at the tip end of the bore 80 and to electrically connect the tip to the casing, the tip is silver soldered to the casing, as at 90 and 92, the solder being initially placed in grooves 94 and 96 provided in the throat portion 86 of the tip member 82.

A ceramic locating cup 98 is provided which defines a recess 100 adapted to receive the silver disc 74 and a portion of the thermistor 70, the marginal portions of the locating cup 98 spacedly encompassing the disc 74 and the thermistor 70 so as to electrically insulate the thermistor from the casing. The end 102 of the cup terminates in spaced relationship with respect to the silver disc 72 so that pressure applied to the cup 98 is also applied to the disc 74 and the thermistor 70 thereby insuring intimate contact between the silver disc and the thermistor and between the silver disc 72 and the tip member 82. In order to prevent fluid from coming into contact with the thermistor 70, a silicon rubber seal 104 is provided adjacent the cup 98. Materials suitable for this purpose include "Silastic," which is made available commercially by the Dow Chemical Company, Midland, Michigan. The seal 104 is adapted to withstand the temperatures to which the probe is subjected, and is expanded into intimate contact with the inner surfaces of the shell member when the probe is assembled.

The Silastic seal 104 bears against a washer 106 and the washer 106, in turn, bears against an elongate ceramic tubular member 108. The opposite end of the ceramic tubular member 108 bears against a ceramic spring seat 110. For the purpose of expanding the sealing elements and to provide pressure on the thermistor and disc elements, a single coil spring 112 is provided, one end portion of which bears against the spring seat 110 while the opposite end portion of the spring 112 bears against a washer 114, the washer 114, in turn, bearing against a sealing element 116 which is also preferably formed of "Silastic" or other suitable material of similar characteristics.

Since a single spring 112 is effective to expand both the sealing member 104 and the sealing member 116 into sealing engagement with the casing 76 as well as to provide pressure on the thermistor and disc elements, it is not necessary to provide grooves or recesses in that portion of the wall 78 which contacts the roast to define anchors for each of a plurality of springs. The resultant smooth surface of the casing prevents the accumulation of excessive amounts of grease and fat on the casing, and enabling the temperature measuring device 30 to be cleaned after use with a minimum of time and effort.

An electrical conductor 118 is provided which extends axially of the shell member through the ceramic tubular member 108, the washer 106, sealing member 104 and the ceramic cup 98. One end of the conductor 118 is silver soldered or otherwise electrically connected to the disc 74, as at 120, while the opposite end of the conductor 118 is electrically connected to a stranded conductor 122, as by a connector 124. When the sealing memebr 104 is expanded, it forms a fluid tight seal against the inner surface of the wall 78 of the shell, and also forms a fluid tight seal along the peripheral portion of the conductor 118 which extends through the sealing member 104. Since the volume of air between the sealing member 104 and the inner end of the tip 82 is relatively small, such a construction substantially prevents the breathing of air or other fluid past the sealing member because of pressure changes due to temperature variations. In order to electrically insulate the conductors 118 and 122 from the spring 112, an insulating sleeve 126 is provided which is interposed between the spring 112 and the conductors 118 and 122. The conductor 122 may be a part of a braided cable 128, and extends through the washer 114, the sealing member 116, a washer 130 and a cap member, generally designated 132. The cap member 132 includes a body portion 134, a neck portion 136 and a head portion 138, the neck portion 136 being provided with circumferentially spaced grooves 140. The head portion 138 is crimped, as at 142, so as to electrically connect the cap member 132 to the braid 144 of the cable 128, the conductor 122 being electrically insulated from the braid by insulation 129. The casing wall 78 is crimped into the recesses 140, as at 146, so as to electrically connect the casing to the cap member 132.

A plug assembly, generally designated 150, is fixed to the remote end of the cable 128. The plug assembly 150 includes a body portion 152 which defines a bore 154 and which is provided with a knob portion 156. The plug assembly also includes a tip 158 and a sleeve 160 which encompasses the tip 158 in the conventional manner and which is electrically insulated therefrom. The cable 128 extends into the bore 154 and the conductor 122 is electrically connected to a terminal 162, the terminal 162 being electrically connected to the tip 158 and being electrically insulated from the sleeve 160. The braid 144 is electrically connected to a terminal 164, the terminal 164 being electrically connected to the sleeve 160 and being electrically insulated from the tip 158. The plug 150 is adapted to be inserted in a jack 166, as shown in Fig. 2, the jack being mounted in the wall of the oven. The jack 166 includes a contact 168 which is adapted to contact the tip 158 of the plug and which is electrically connected to the gauging circuit 32. The jack also includes a contact 170 which is adapted to contact the sleeve 160 of the plug and which is electrically connected to the secondary winding 52 of the transformer. If desired, the jack 166 may be provided with a sleeve contact 172 which is adapted to electrically contact the body portion of the plug, the sleeve contact 172 being grounded, as at 174. It will be noted that the circuit through the probe as well as the circuit through the indicator, the voltage regulator, and the transformer is completely open when the plug is removed from the jack.

In the operation of this embodiment of the invention, the plug 150 is inserted in the jack 166 and the temperature measuring device 30 is inserted in the roast so that the tip 82 is located at a position substantially in the center of the roast. When the plug 150 is inserted in the jack, a circuit is completed from the contact 168 through the tip 158 of the plug, the terminal 162, the conductor 122, the conductor 118, the silver disc 74, thermistor 70, silver disc 72, the tip 82, the casing 76, the cap member 132, the braid 128, the sleeve 160 of the plug 150, to the contact 170 of the jack. Upon completion of the just-traced circuit, the thermistor 70 is heated due to the resistance thereof and the heat emitted by the thermistor 70 is conducted through the silver disc 72 and the copper tip 82 to the roast. Since the area of the surface 88 is at least twice the transverse cross-sectional area of the throat 86, the tip 82 increases the area of the heat transfer surfaces of the thermistor so that the thermistor, in effect, is quenched by the roast, and the thermistor assumes a temperature which is substantially the same as the temperature of the roast. Since the resistance of the thermistor is a function of the temperature thereof, the current flowing through the gauge 42 is a function of the mean temperature at the center of the roast and the needle 56 of the gauge moves proportionately to the warping of the bimetallic element of the gauge, the bimetallic element of the gauge, in turn, being heated by the heater winding of the gauge in the conventional manner. As the temperature at the center of the roast increases, the current flowing through the thermistor also increases with the result that additional heat is imparted to the bimetallic element of the gauge by the heater winding therein, thereby effecting a higher reading of the needle element 56 on the associated scale of the gauge. The voltage of the circuit is regulated by the voltage regulator 34, as previously described, to insure the accuracy of the measurement.

The position of the contact 66 relative to the contact 64 may also be adjusted so that a signal or other control function will be provided upon the attainment of a predetermined temperature. The current flowing through the circuit 32 also flows through the winding 62 of the integrating relay 58, and the bimetallic element 60 warps due to the heating effect of the winding 62. When the current flowing through the winding 62 reaches a predetermined value, sufficient heat is imparted to the bimetallic element 60 to warp the element 60 sufficiently to cause the contact 64 to make with the contact 66. A second circuit is then completed through the bimetallic element 60, the contacts 64 and 66, and the signaling element 68, thereby indicating that the temperature at the center of the roast has reached a predetermined value.

While a preferred embodiment of the invention has been shown and described, it will be understood that various changes and modifications may be made without departing from the spirit of the invention.

What is claimed is:

1. In a temperature sensing device for sensing the internal temperature of meat, fowl, or the like being cooked in an oven and immersible in liquid for washing and subject to substantial changes of temperature tending to lead to leakage of liquid into the device, the combination including a tubular casing, temperature variable resistance means disposed in said casing, a pair of resilient and radially expansible spaced-apart fluid sealing means disposed in said casing for sealing the volume therebetween, and single spring means in said casing and disposed between said sealing means for exerting forces on both of said fluid sealing means for expanding both of said sealing means radially into sealing engagement with respect to said casing.

2. In a temperature sensing device for sensing the internal temperature of meat, fowl, or the like being cooked in an oven and immersible in liquid for washing and subject to substantial changes of temperature tending to lead to leakage of liquid into the device, the combination including a tubular casing having a smooth substantially unbroken peripheral wall defining a bore, temperature-responsive variable resistance means disposed in said casing, a pair of resilient and radially expansible spaced-apart fluid sealing members in said casing for sealing the volume therebetween, and single spring means in said casing and disposed between said sealing members for exerting forces on both of said sealing members for expanding both of said sealing members radially into sealing engagement with respect to said casing.

3. In a temperature sensing device for sensing the internal temperature of meat, fowl, or the like being cooked in an oven and immersible in liquid for washing and subject to substantial changes of temperature tending to lead to leakage of liquid into the device, the combination including a tubular casing defining a bore, a tip having a portion thereof secured to said casing, temperature-responsive variable resistance means disposed in said casing in heat transfer relationship with respect to said tip, a pair of resilient and radially expansible spaced-apart fluid sealing means disposed in said casing in axially spaced relationship with respect to said resistance means for sealing the volume therebetween, and a single spring in said casing and disposed between said sealing means for exerting forces on both said sealing means and effective to expand both of said sealing means radially into sealing engagement with respect to said casing.

4. In a temperature sensing device for sensing the internal temperature of meat, fowl, or the like being cooked in an oven and immersible in liquid for washing and subject to substantial changes of temperature tending to lead to leakage of liquid into the device, the combination including an elongate tubular casing defining a bore, a temperature-responsive resistance element disposed in said casing, an electrical conductor extending longitudinally of said casing and electrically connected to said element, a pair of resilient and radially expansible spaced-apart fluid sealing members disposed on the same side of said element in said casing in axially spaced relationship for sealing the volume therebetween, one of said sealing members encompassing said conductor, and single spring means in said casing disposed between said sealing members for exerting forces on both of said sealing members for expanding both of said sealing members radially into fluid sealing engagement with respect to said casing and said one sealing member radially into fluid sealing engagement with respect to said conductor.

5. In a temperature sensing device for sensing the internal temperature of meat, fowl, or the like being cooked in an oven and immersible in liquid for washing and subject to substantial changes of temperature tending to lead to leakage of liquid into the device, the combination including an elongate tubular casing defining a bore open at each end, a tip member having a portion thereof disposed in said bore in fluid tight relationship with said casing, a temperature-responsive resistance element disposed in said casing in electrically conducting and heat transfer relationship with respect to said tip member, an electrical conductor extending longitudinally of said casing and electrically connected to said element, a pair of resilient and radially expansible spaced-apart fluid sealing members disposed in said casing in axially spaced relationship for sealing the volume therebetween, both of said sensing members being to the side of said resistance element which is remote from said tip, one of said sealing members encompassing said conductor, and a single spring in said casing and disposed between said sealing members for exerting forces on both of said sealing members for expanding both of said sealing members radially into fluid sealing engagement with respect to said casing and said one sealing member radially into fluid sealing engagement with respect to said conductor.

6. In a temperature sensing device for sensing the internal temperature of meat, fowl, or the like being cooked in an oven and immersible in liquid for washing and subject to substantial changes of temperature tending to lead to leakage of liquid into the device, the combination including an elongate tubular member defining a bore open at each end, a tip member having a portion thereof disposed in said bore in sealing engagement with respect to said casing, a temperature-responsive resistance element disposed in said casing in electrically conducting and heat transfer relationship with respect to said tip member, a pair of resilient and radially expansible spaced-apart fluid sealing members in said casing for sealing the volume therebetween, both of said sealing means being to the side of said resistance element which is remote from said tip, and a single spring in said bore and disposed between said sealing members for exerting forces on both of said sealing members and on said element and to maintain said element and said tip member in electrically conducting and heat transfer relationship and to expand said sealing members radially into fluid sealing engagement with respect to said casing.

7. In a temperature sensing device immersible in liquid for washing and subject to substantial changes of temperature, the combination comprising an elongate tubular casing defining a bore, a tip member having a portion thereof secured to said casing, a cap member having a portion thereof projecting into the end of said bore remote from said tip member, a first electrically and heat conductive disc disposed in said casing in electrically conductive and heat transfer relationship with respect to said tip member, a temperature-responsive variable resistance element having a coefficient of electrical resistance which varies substantially as a function of the temperature of the element, said element being disposed in electrically conducting and heat transfer relationship with respect to said first disc, a second electrically conductive disc disposed in said casing in electrically conducting engagement with respect to said element, an electrical conductor extending axially of said casing and electrically connected to said second disc, a pair of spaced-apart sealing members disposed in said casing intermediate said element and said cap member for sealing the volume therebetween, and single spring means in said casing exerting forces on both of said fluid sealing means and effective to maintain said discs and said element in electrically conducting relationship, said single spring means also being effective to expand said sealing members into fluid sealing engagement with said casing.

8. In a culinary temperature sensing device immersible in liquid for washing and subject to substantial changes of temperature, the combination including an elongate tubular casing having a substantially smooth unbroken peripheral surface and defining a bore open at each end, a tip having a portion thereof secured to one end of said casing in electrically conducting relationship with respect thereto, a temperature-responsive variable resistance element disposed in said casing in electrically conducting and heat transfer relationship with respect to said tip member, a cap member having a portion thereof projecting into the end of said bore remote from said tip member and mechanically and electrically connected to said casing, an electrical conductor extending axially of said casing and electrically connected to said element, a pair of spaced-apart sealing members disposed in said casing in longitudinally spaced relationship for sealing the volume therebetween, both of said sealing means being to the side of said resistance element which is remote from said tip, one of said sealing members encompassing said conductor, and a single spring in said casing exerting forces on both of said fluid sealing means and effective to expand said sealing members into fluid sealing engagement with respect to said casing and to expand said one sealing member into fluid sealing engagement with respect to said conductor.

References Cited in the file of this patent

UNITED STATES PATENTS

| | | |
|---|---|---|
| Re. 21,716 | Bacon | Feb. 18, 1941 |
| 1,190,978 | Bliss | July 11, 1916 |
| 2,296,542 | Steen | Sept. 22, 1942 |
| 2,379,530 | Lederer | July 3, 1945 |
| 2,480,166 | Schwartzwalder | Aug. 30, 1949 |
| 2,484,585 | Quinn | Oct. 11, 1949 |
| 2,635,137 | Basham | Apr. 14, 1953 |
| 2,736,784 | Gore | Feb. 28, 1956 |

UNITED STATES PATENT OFFICE

CERTIFICATE OF CORRECTION

Patent No. 2,890,429 June 9, 1959

Harry I. Baker

It is hereby certified that error appears in the printed specification of the above numbered patent requiring correction and that the said Letters Patent should read as corrected below.

Column 8, line 21, for "temperature" read -- temperature-responsive --.

Signed and sealed this 22nd day of December 1959.

(SEAL)
Attest:

KARL H. AXLINE
Attesting Officer

ROBERT C. WATSON
Commissioner of Patents